J. d'HEUREUSE.

Process for Mashing Grain.

No. 8,224. Reissued May 14, 1878.

Witnesses:

T. C. Brecht.

Daniel R. Garden.

Inventor:

Julius d'Heureuse

Per R. d'Heureuse.

Attorney.

UNITED STATES PATENT OFFICE.

JULIUS D'HEUREUSE, OF SCHMETZDORF, NEAR BERNAU, PRUSSIA.

IMPROVEMENT IN PROCESSES FOR MASHING GRAIN.

Specification forming part of Letters Patent No. 176,631, dated April 25, 1876; Reissue No. 8,224, dated May 14, 1878; application filed February 26, 1878.

*To all whom it may concern:*

Be it known that I, JULIUS D'HEUREUSE, of Schmetzdorf, in Prussia, Germany, have invented a new and useful Improvement in Treating and Mashing Corn and other Grain, &c., which improvement is fully set forth in the following specification, reference being had to the accompanying drawing.

The object of my invention is to comminute or disintegrate the substance of corn or other grain or products more perfectly and economically than by the present modes in use. The hulls or skins of corn or other grain or leguminous products being left comparatively intact by my process, they may be separated quickly and economically from the useful portion.

The first object is accomplished by subjecting the corn or other grain, &c., entire, with water in a close vessel, by slow stirring, to the effect of steam under pressure, or to heat and other pressure, either whole, broken, or ground, when, after some time, the substance of the corn, &c., will be found entirely disintegrated, forming a homogeneous, more or less pasty, mass or soup.

Unless the mass is stirred during the operation of steaming it will be but imperfectly disintegrated. The steam, forcing its way through well-defined channels, unduly affects those portions of the mass near the channels, while other portions remain unacted upon, and as a consequence the resulting mass is full of lumps not uniformly acted upon by the steam. It therefore becomes essential that the mass should be agitated by stirring during the act of steaming, and whole grain treated in this way gives results superior to ground grain when steamed, and then, when the material is reduced to this state or condition, discontinuing the heat and pressure. The hulls or skins, left comparatively intact, can then be readily removed from the disintegrated parts by blowing or forcing the mass through sieves or strainers.

In the accompanying drawing like letters indicate like objects.

Figure 1:
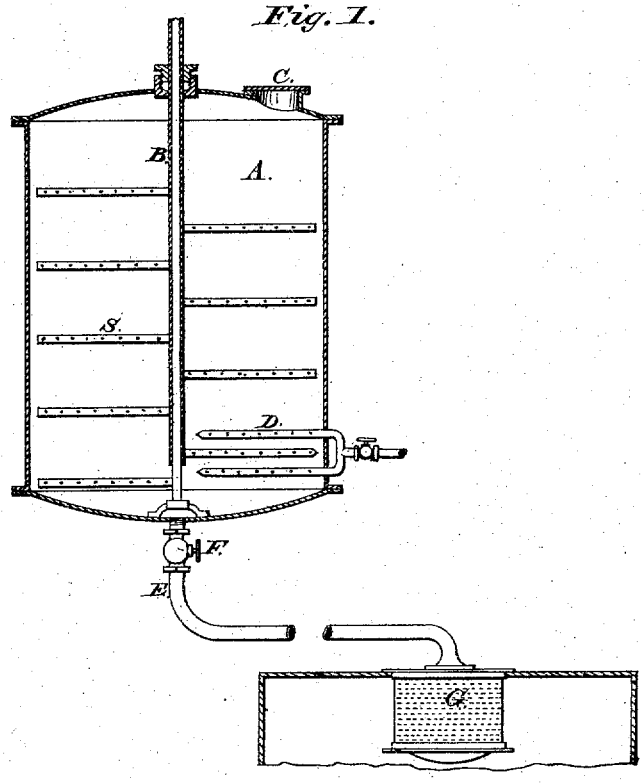
Figure 2:
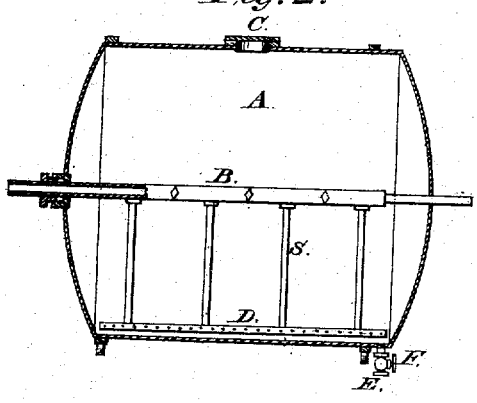
Figure 3:
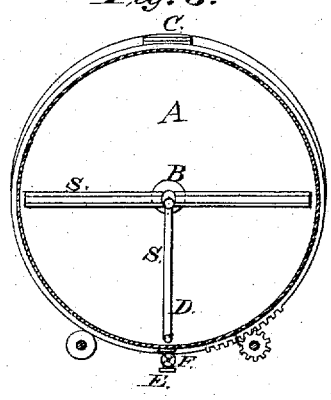

Figure 1 represents a sectional elevation of a vertical tank suitable for the purpose; Figs. 2 and 3, an inclined or nearly horizontal tank, A, of suitable material, in which a shaft, B, provided with stirrers S, can revolve entirely, or execute a rocking, swinging, or to-and-fro motion. The shaft passes through one or more stuffing-boxes in the side or sides of the tank.

C is a charge or man hole. The pipe or pipes D supply the steam directly from without or by way of the shaft B, which then is hollow, and has all or some hollow arms, suitably perforated or opened for the admission of steam or air. E is the discharge-pipe, with valve, gate, or faucet F; and G represents the screen, sieve, or strainer, suitably constructed.

There may be pressure or steam gage, steam-jacket, thermometer, water or air pipes to the tank.

The mode of operation is as follows, applying, for instance, to the disintegration of corn for distilling and brewing purposes: The tank is charged with the corn or other grain, &c., previously cleaned or washed, if required, and the proper proportion of water, of which for distill-mash a quantity exceeding in weight somewhat that of the corn, &c., answers well. All openings are closed after the steam has been turned on and the air has escaped, and the stirrers are put in operation, which may be done by revolving or swinging the shaft B or tank A. This stirring may be intermittent or continuous. With a steam-pressure of about forty to fifty pounds per inch corn is disintegrated, a homogeneous mass produced within three or four hours, other products in more or less time, and the mass is then ready to be discharged into the mash-tun, if intended for distillation, brewing, or kindred purposes. There the addition of malt at the proper temperature converts quickly and completely the starch of the material into sugar, considerably more of which is formed than by the ordinary modes of mashing corn or other grain ground in a mill, and in less time. The reason for a more complete and quick production of extractive matter must be found in the fact that by my process the disintegration of all starchy particles is more complete by far than by mill-ground corn or other grain, and that every particle of the mass is thus brought immediately into contact with the acting diastase. As a consequence, a richer wort is drawn, or more alcohol produced, from the same quantity of corn or other grain than by the ordinary mode of mashing meal.

The disintegration may be also effected under a pressure not that, or not only that, of live steam, but, for instance, by the assistance of compressed air. The pressure can thus be raised and maintained at the required point without increasing that of the steam, and, in fact, independent of steam. The air then is forced into and enters the tank below or above the surface of its contents, even at or near the bottom of the tank, and by the same or different pipe or pipes by which the steam, if any, is admitted. In this case steam at low pressure may serve for merely heating the substances under treatment in the water to the required temperature, which, for instance, for malt should, or for other substances and certain purposes might, remain considerably below 212° or even 150° Fahrenheit, while it may rise above 212°. The mass thus produced may be treated subsequently, according to the purposes intended, as a whole, or its components separated by suitable means. By this mode malt for brewing could be disintegrated and its substance extracted quicker and more completely than by the expensive mash-tuns now frequently used.

The grains or cereals treated by this invention may be whole, broken, or ground.

Peas, beans, and other leguminous products are reduced to a pasty consistency more quickly and completely in the manner explained than by the ordinary mode of boiling in open kettles.

The homogeneous mass produced as hereinabove described from corn or other grain, &c., if blown or forced through suitable screens, sieves, or strainers, G, is freed from all hard gritty matter pertaining to hulls or skins retained by the strainers, through which only the finely-disintegrated parts are or may be allowed to pass. By connecting the strainer or strainers to the discharge-pipe E, this object is accomplished most conveniently and economically, while the mass is blown or discharged from the disintegrator, though it may be done as a subsequent operation—for instance, by centrifugal strainers.

By disintegrating corn or other grain or products in the manner hereinbefore described under pressure, a mass can be obtained at a trifling cost, without expensive machinery, which contains all of the valuable portion of the products, and as an article of food could be prepared ready for immediate consumption by itself or to constitute a basis of numerous articles of diet. It may, however, be dried after or without being freed from the hulls, in form of cakes, sheets, strings, in granular or other form, preferably in suitably-constructed drying chambers or kilns, and in such condition can be kept for any length of time ready for immediate use. Salt, condiments, or other substances may be added while in the tank or disintegrator, and thus be thoroughly incorporated and mixed with the material, or they may be added subsequently.

Immense quantities of corn, now comparatively worthless in certain sections of the country, can, in the manner described, be converted cheaply into very desirable articles of commerce of much enhanced value. The same to some extent applies to other grain, pease, beans, &c.

I am aware that it is not new to produce glucose sugar from whole grain by feeding the grain, in regulated quantities, into a tank containing dilute sulphuric acid, agitated during the feeding operation for the purpose of preserving a uniform temperature, and then subjecting it to heat and pressure. In that treatment the sulphuric acid performs the chemical action of conversion. My object is not to effect such chemical change, and, the above not being my invention, I enter a disclaimer to the same.

What I claim is—

1. The process of preparing a pasty or pulpy mass from grains, seeds, and cereals, for the purposes set forth, which consists in feeding the material into a close tank containing water, and then and there subjecting the same, under a stirring operation, to heat and pressure, the heat and pressure being discontinued when the material is reduced to a pasty or pulpy consistency, substantially as described.

2. In the reduction of grains, seeds, and cereals, as described, the process of rendering the disintegrated material readily transportable and comparatively free from hulls and the like, which consists in separating the hard from the soft portions by sifting and then drying the mass, substantially as set forth.

3. In the reduction of grains, seeds, and cereals, as described, the process of rendering the disintegrated material readily transportable, which consists in drying the mass subsequent to its reduction to a pasty or pulpy consistency, substantially as set forth.

JULIUS D'HEUREUSE.

Witnesses:
HERMANN KONOW,
MAX KÜHN.